(12) United States Patent
Miao et al.

(10) Patent No.: US 12,725,542 B2
(45) Date of Patent: Sep. 1, 2026

(54) ENVIRONMENT MATCHING FOR MIXED REALITY

(71) Applicant: Meta Platforms Technologies, LLC, Menlo Park, CA (US)

(72) Inventors: Jun Miao, San Jose, CA (US); Guodong Rong, Saratoga, CA (US); Honghong Peng, Los Altos, CA (US); Ruidong Zhu, San Jose, CA (US); Jeanne Vu, Brea, CA (US); Jiangtao Kuang, San Jose, CA (US); Alex Dongseok Shin, Brea, CA (US); Zilong Li, Pittsford, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/092,865

(22) Filed: Mar. 27, 2025

(65) Prior Publication Data

US 2025/0336319 A1 Oct. 30, 2025

Related U.S. Application Data

(60) Provisional application No. 63/640,815, filed on Apr. 30, 2024.

(51) Int. Cl.
*G09G 3/34* (2006.01)
*G02B 27/01* (2006.01)
(Continued)

(52) U.S. Cl.
CPC ......... *G09G 3/001* (2013.01); *G02B 27/0172* (2013.01); *G09G 3/3406* (2013.01);
(Continued)

(58) Field of Classification Search
CPC .............. G02B 27/017; G02B 27/0172; G02B 2027/0138; G02B 2027/014; G09G 3/001;
(Continued)

(56) References Cited

U.S. PATENT DOCUMENTS

2009/0237423 A1* 9/2009 Shih .................... G09G 3/3406 345/102
2013/0335404 A1* 12/2013 Westerinen ............ G06F 3/033 345/158

(Continued)

OTHER PUBLICATIONS

Notice of Allowance mailed Nov. 24, 2025 for U.S. Appl. No. 18/782,296, filed Jul. 24, 2024, 9 pages.

(Continued)

*Primary Examiner* — Cory A Almeida
(74) *Attorney, Agent, or Firm* — FREESTONE INTELLECTUAL PROPERTY LAW PLLC; Aaron J. Visbeek

(57) ABSTRACT

Systems and methods for Mixed Reality (MR) applications in a head-mounted display. In implementations, an ambient light sensor (ALS) or world-side camera capture an ambient light measurement of an environment of a world-side scene. In some aspects, based on the ambient light measurement, one or more processing logic may be configured to adjust a brightness and/or color temperature of pass-through images and virtual images to harmonize a user's viewing experience while using the head-mounted display.

20 Claims, 7 Drawing Sheets

600

(51) Int. Cl.
*G09G 3/00* (2006.01)
*H05B 47/11* (2020.01)
*H05B 47/125* (2020.01)
*H05B 47/165* (2020.01)

(52) U.S. Cl.
CPC ........... *H05B 47/11* (2020.01); *H05B 47/125* (2020.01); *H05B 47/165* (2020.01); *G02B 2027/0138* (2013.01); *G02B 2027/014* (2013.01); *G09G 2320/0626* (2013.01); *G09G 2320/0666* (2013.01); *G09G 2360/144* (2013.01)

(58) Field of Classification Search
CPC ......... G09G 3/3406; G09G 2320/0626; G09G 2320/0666; G09G 2360/144; H05B 47/11; H05B 47/125; H05B 47/165
See application file for complete search history.

(56) References Cited

U.S. PATENT DOCUMENTS

| | | | | |
|---|---|---|---|---|
| 2020/0098335 | A1* | 3/2020 | Chen | G09G 5/10 |
| 2023/0003931 | A1 | 1/2023 | Nakamura et al. | |
| 2023/0015732 | A1* | 1/2023 | Andall | G06F 3/011 |

OTHER PUBLICATIONS

Notice of Allowance mailed Apr. 2, 2026 for U.S. Appl. No. 18/782,296, filed Jul. 24, 2024, 7 pages.

* cited by examiner 100
143
141
120
142
142
118
140
155
118
140
144
150

ENVIRONMENT MATCHING FOR MIXED REALITY

CROSS-REFERENCE TO RELATED APPLICATION

This application claims the benefit of U.S. Provisional Application No. 63/640,815, entitled Environment Matching for Mixed Reality, filed Apr. 30, 2024, which is expressly incorporated herein by reference in its entirety.

TECHNICAL FIELD

This disclosure relates generally to adjustment of color and/or brightness of a viewer's experience, in particular as related to Virtual Reality (VR) or Mixed Reality (MR) applications in head-mounted devices.

BACKGROUND INFORMATION

Ambient light or environmental light may include the properties of brightness (illuminance) and color warmth (color temperature). Brightness is measured in lux (lx), which quantifies the amount of light falling on a surface. Lux is measured in terms of lumens per square meter (lm/m$^2$). Typical indoor lighting levels may range from 100-200 lux in dimly lit rooms, 300-500 lux in offices, and 1000+ lux in brightly lit spaces. Direct sunlight can exceed 10,000 lux. Color warmth, on the other hand, describes the hue of the light. Correlated Color Temperature (CCT) represents a measurement of the color warmth of ambient light, measured in Kelvin (K). It describes how "warm" (yellow/red) or "cool" (blue/white) light appears. Warmer temperatures (~2700K) can create a cozy, relaxing environment, while cooler temperatures (~5000K+) resemble daylight and can enhance alertness.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
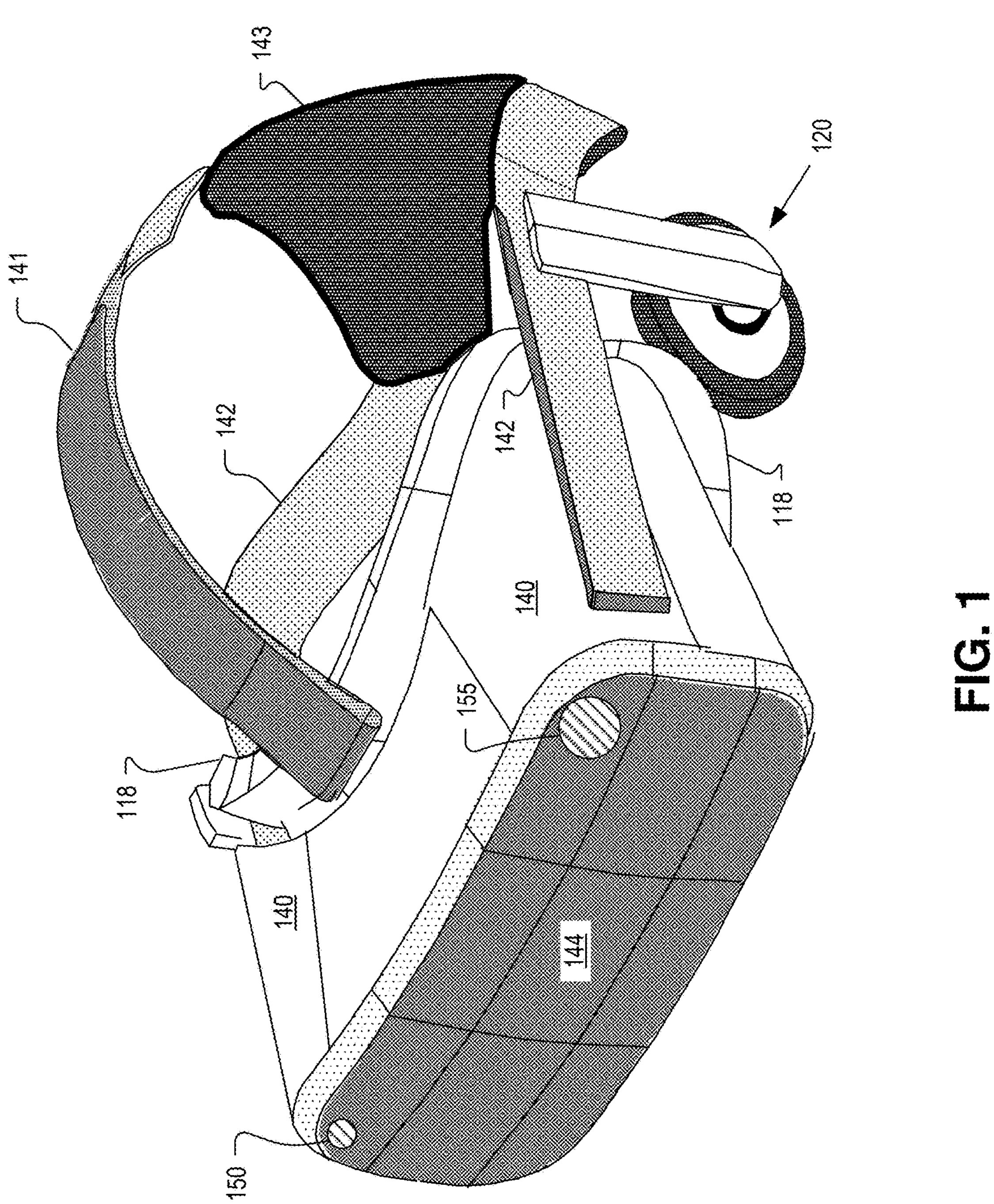
FIG. 1 illustrates a head-mounted display, in accordance with aspects of the disclosure.

Embodiments of environment matching for mixed reality (MR) are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Mixed Reality (MR) headsets or head-mounted displays (HMDs) have world-facing cameras to capture images of an ambient environment. The images are then rendered to a display of an HMD as pass-through images so that a user can view their external or real-world environment via a world-side scene. Virtual images may also be rendered on the display so that virtual objects become a part of the world-side scene. Pass-through images displayed by the HMD, however, may not reflect the brightness and/or color (e.g., color warmth) of the real-world environment. Even when the pass-through images are consistent with the external world, they are often displayed with virtual images that have a completely different brightness or color warmth level. This misalignment can be discordant for the user. In other situations, the real-world environment may be overly bright or include high levels of blue light, and the user may desire the pass-through images and/or virtual images to be displayed with more comfortable lighting.

Accordingly, a system architecture for mixed reality (MR) headsets or HMDs to enhance color and brightness control for environment matching is disclosed herein. In examples, an MR immersive experience is enhanced by dynamically adjusting pass-through color and/or brightness to match a real-world environment. In aspects, the MR pass-through images may be aligned to white point warmness and brightness of the physical surrounding for a natural perceptual experience for a user. Virtual images may also be adjusted based on brightness and/or color temperature in order to harmonize the virtual images into the adjusted MR pass-through images. In implementations of the disclosure, display brightness (e.g., display backlight brightness) may be adjusted based on environmental illuminance to reduce power consumption and improve battery life.

FIG. 1 illustrates an example head mounted display (HMD) 100 including a top structure 141, a rear securing structure 143, and a side structure 142 attached with a viewing structure 140, in accordance with implementations of the disclosure. The illustrated HMD 100 is configured to be worn on a head of a user of the HMD. In one implementation, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100. Viewing structure may include a display side 144 that is proximate to a display panel that generates virtual images for presenting to an eye of a user of HMD 100. An ambient light sensor (ALS) 150 may be located on a front-side of HMD 100 and take a measurement to detect a brightness and/or color of environmental or ambient light. In embodiments, ALS 150 includes a plurality of photodetectors that measure an ambient light intensity as well as color components. ALS 150 may include RGB (Red, Green, Blue) and sometimes IR (Infrared) channels, allowing analysis of both brightness (lux) and color temperature (Kelvin).

A camera or world-facing camera 155 may also be located on a front-side of HMD 100 and may capture an image of an environment of a world-side scene. World-facing camera 155 may take an ambient light measurement to detect brightness and color of environmental light. World-facing camera 155 may have Auto White Balance (AWB) and Auto Exposure (AE) functions or capabilities. In embodiments, world-facing camera 155 includes an image sensor including photodetectors and an Image Signal Processor (ISP) to dynamically adjust color and brightness based at least on environmental or ambient lighting conditions. The AWB function may analyze the scene's light spectrum through RGB channels, and may adjust a color temperature to match a real-world environment or based on provided CCT targets.

Example HMD 100 also includes a chassis for supporting hardware of the viewing structure 140 of HMD 100. Hardware of viewing structure 140 may include one or more processing logic, wired and/or wireless data interface for sending and receiving data, graphic processors, and one or more memories for storing data and computer-executable instructions. In one implementation, viewing structure 140 may be configured to receive wired power. In one implementation, viewing structure 140 is configured to be powered by one or more batteries. In one implementation, viewing structure 140 may be configured to receive wired data including video data. In one implementation, viewing structure 140 is configured to receive wireless data including video data.

Viewing structure 140 may include a display system having one or more electronic components, such as electronic configured to emit display light to an eyebox region of HMD 100. The display system may include one or more of a liquid crystal display (LCD), an organic light emitting diode (OLED) display, a micro-LED display, etc. for emitting light (e.g., content, images, video, etc.) to a user of HMD 100.

Implementations of the disclosure may bridge the visual gap between a mixed reality (MR) HMD and the physical world. Note that in aspects, "MR mode" may refer to a mode where display images primarily include pass-through images mixed with or overlaid with virtual images. In various embodiments, virtual images in this disclosure may refer to any user interface (UI) element or window, video viewer, applications (Apps), icons, virtual animals, or other virtual objects that are suitable for MR or VR applications. In aspects, a pass-through home screen may refer to a pass-through background mixed with virtual menu options, icons or the like, from which the user may launch applications, etc.

In aspects, "VR mode" may refer to a mode where a display screen may include primarily virtual images without a pass-through background (e.g., a VR scene including all virtual elements such as a VR home screen with a VR background and from which menu options or Apps may be selected) or when a user is using an App that only displays virtual elements.

Figure 2:
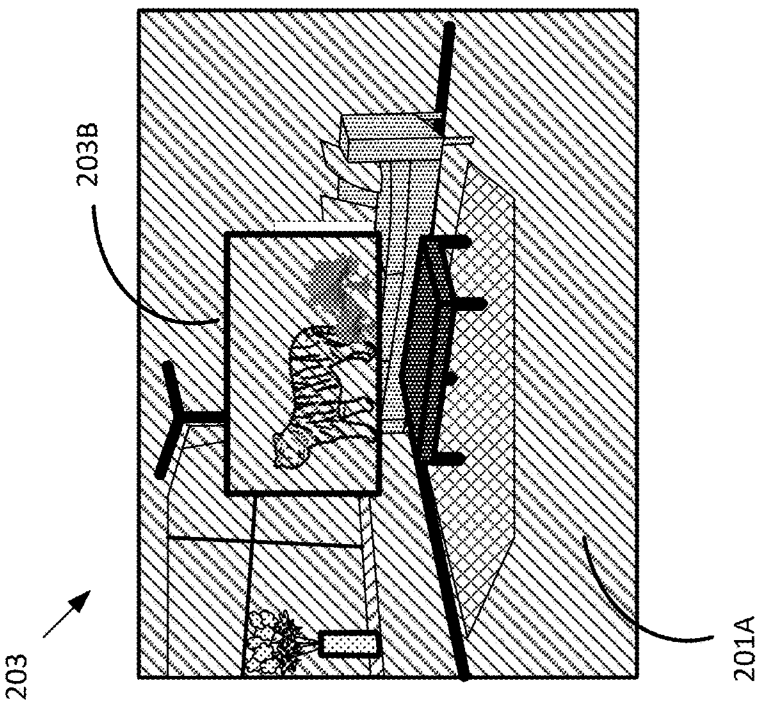
FIG. 2 illustrates an example unadjusted display image and adjusted display image as seen through the head-mounted display of FIG. 1, in accordance with aspects of the disclosure.
Figure 2:
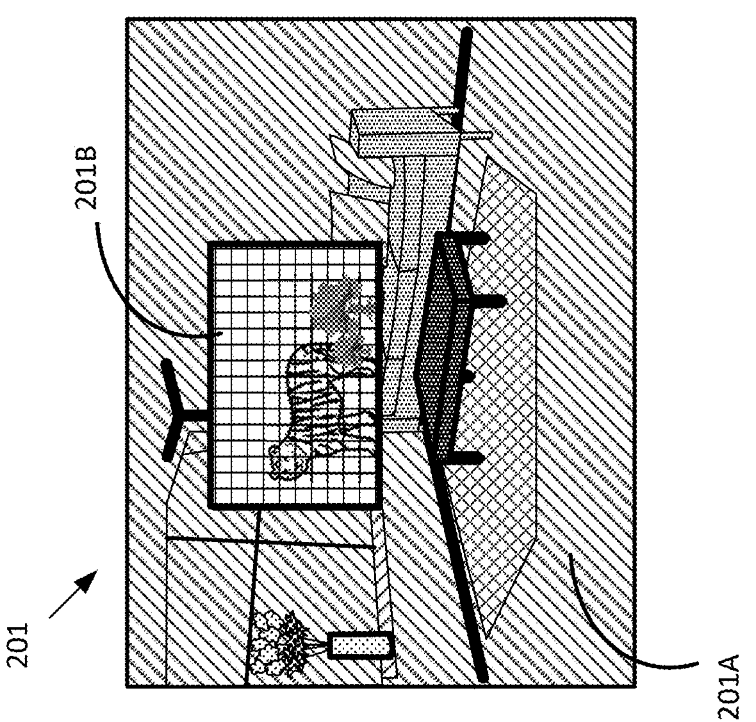

As an example, FIG. 2 illustrates an example unadjusted image and example adjusted image as seen through a head-mounted display, such as HMD 100 of FIG. 1. As shown, unadjusted display image 201 include pass-through images 201A which include, e.g., a world-side scene of a user's living room (e.g., real-time living room). Unadjusted display image 201 also includes a virtual image including an Application ("App") window 201B. In FIG. 2, App window 201B illustrates a video viewer or other App that may be running. In examples, App window 201B may represent any virtual image or object e.g., an icon, or other user interface (UI) window on HMD 100.

Next to unadjusted display image 201 is adjusted display image 203 which includes pass-through images 201A of the world-side scene and App window 203B. In the adjusted display image 203, however, App window 203B has been adjusted based on an ambient light measurement to display color with a warmer temperature and/or differing brightness to integrate original App window 201B with pass-through images 201A of the world-side scene. In the example, a color temperature, e.g., a correlated color temperature (CCT) or brightness (lux) of the virtual images (App window 203B) has been adjusted to provide a more cohesive and enjoyable viewing experience.

Figure 3:
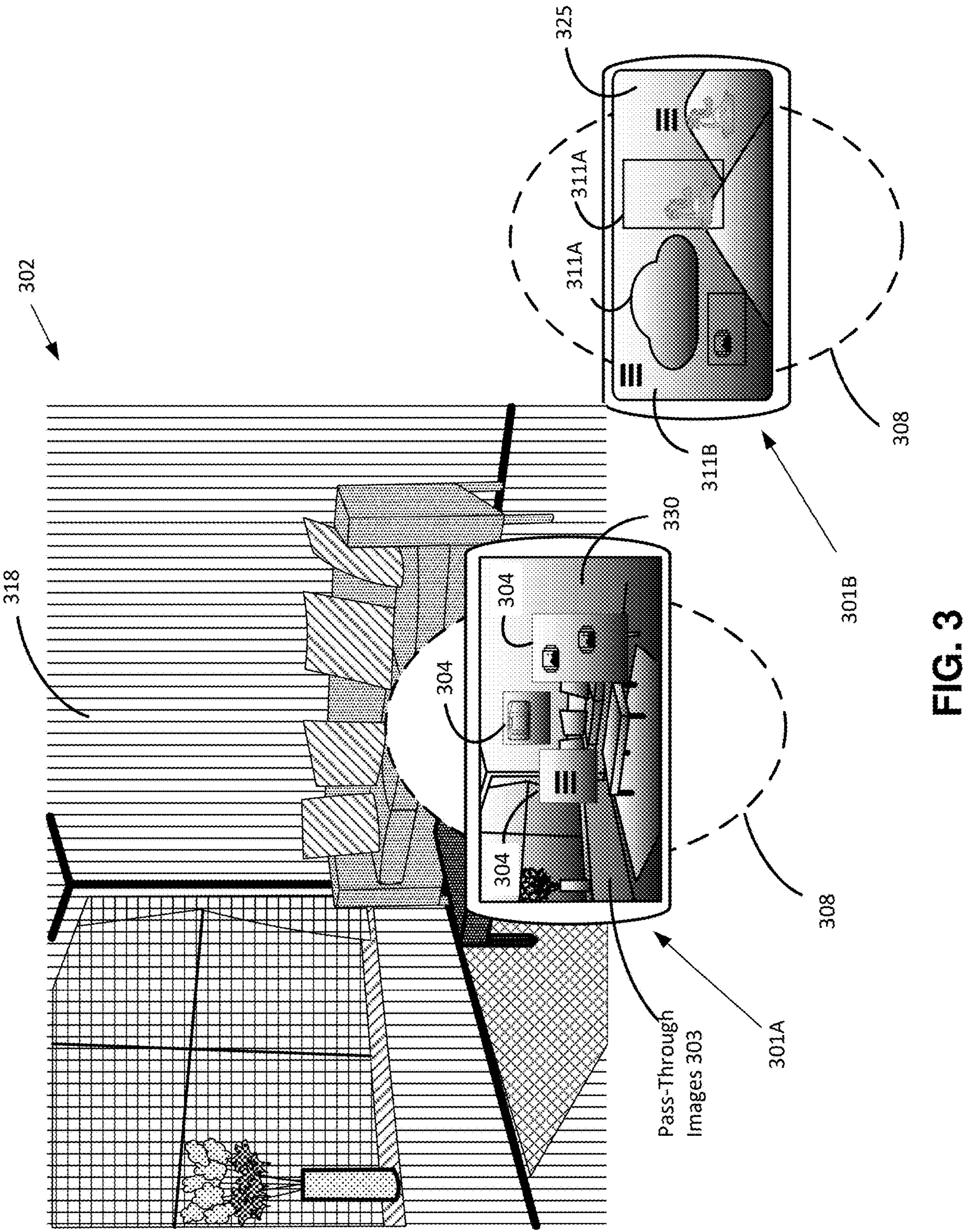
FIG. 3 illustrates an example of adjusted pass-through images and adjusted virtual images, in accordance with aspects of the disclosure.

FIG. 3 illustrates an example of adjusted pass-through images and adjusted virtual images, in accordance with embodiments. In the example, external environment 302 has an environmental light or ambient light 318 (illustrated via cross-hatching) having a real-life color warmth corresponding to a CCT value and a real-life brightness, e.g., lux value. In various aspects, pass-through images and/or virtual images of example display images 301A and 301B of an HMD 100 may be adjusted to match the CCT values and lux values of the ambient light measurements or to deviate from the real-life values. In some embodiments, the values may be adjusted automatically or manually through inputs or user settings from a user (e.g., 308), for comfort or utility. In FIG. 3, display image 301A shows pass-through background ("pass-through images 303") and virtual images 304, together which may form a pass-through home screen. A display image 301B includes a plurality of virtual images 311A on a virtual background 311B without pass-through images, which may form in some examples, a VR home screen. Note that only some of the virtual images are labeled to avoid clutter in FIG. 3.

As noted above, the user may desire pass-through images and/or virtual images to match brightness and/or color temperature of their real-world environment. At other times, the user may elect to deviate the settings of display images 301A and 301B from matching the real-world environment. In the example of FIG. 3, an ambient light 325, 330 of display images 301A and 301B are adjusted to more comfortable brightness levels and color warmth levels than those of the real-world environment 302.

In aspects, the HMD implements an auto-brightness feature to adjust the pass-through images and virtual images as described above. In some embodiments, the auto-brightness feature is based at least in part on previous user preferences. In embodiments, an initial brightness level established for pass-through images of a home environment may be influenced by a previous eye adaptation that occurs within real-world lighting. Thus, in examples, a default brightness (e.g., 80%) of a display backlight does not need to remain constant, which may contribute to saving energy for HMD 100. In examples, the auto-brightness feature or mechanism may include an underlying Look-Up Table (LUT) derived from user preferences determined through a study conducted on the HMD. In aspects, a study prompts a user to select their preferred brightness level after a full eye adaptation, while also prioritizing visibility of the external world-side environment 302. Accordingly, a user's viewing comfort may be accommodated without compromising visibility during tasks and App usage while the user wears the HMD.

In extremely dimly lit real-world environments, a safety feature of the HMD may include an automatic increase in brightness or manual user adjustments (via previously mentioned user settings including toggles/sliders) so that objects in a pass-through background can be more easily discerned. In an implementation, a depth map generated by a depth sensor of the HMD may highlight (e.g. render a virtual boundary around) objects (e.g., furniture/animal/doorways in the real world) that are in close proximity to the user.

Figure 4:
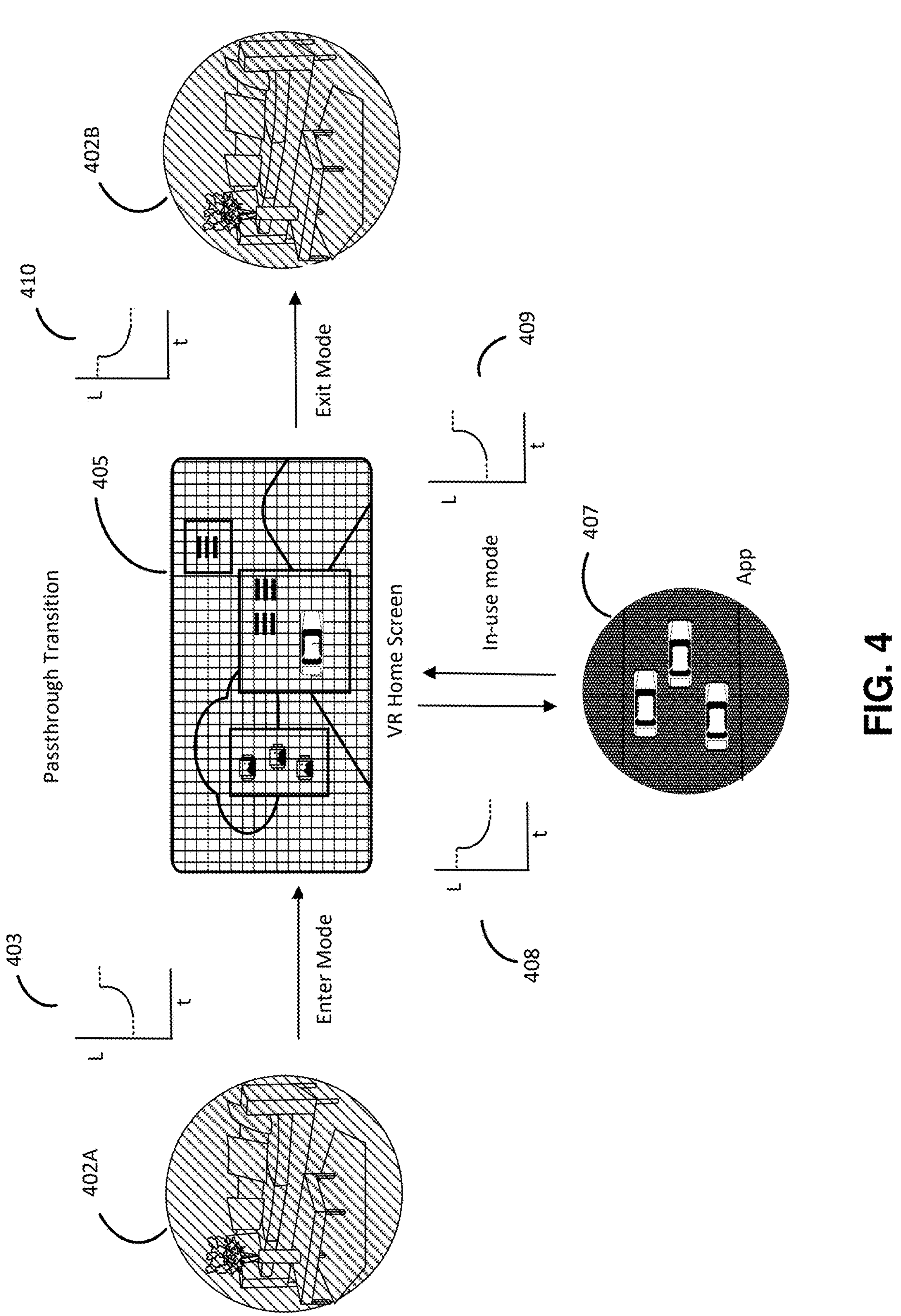
FIG. 4 is a diagram illustrating fluid transitions between a user's view of pass-through images and a VR scene, in accordance with aspects of the disclosure.

Next, FIG. 4 is a diagram illustrating fluid transitions between various combinations of MR mode, VR mode, and a real-world environment, in accordance with embodiments. In some aspects, a pass-through mode of the HMD (e.g., HMD 100) may smoothly transition brightness and/or color temperature of pass-through images or virtual images to reflect a real-world environment that becomes dimmer or brighter. In other embodiments, a pass-through mode may cause the HMD to automatically smoothly transition from a brightness or color temperature of a VR scene (e.g., VR scenes are often rendered in a bright default white point of D65) to a similar color warmth (or brightness) of the real-world environment.

Without fluid transitions, varying brightness and white point conditions between a world-side scene and a VR scene may create a jarring visual effect for a user. To avoid this, a display image may gradually or fluidly transition from a lux value measured in a dim real-world environment 402A to a differing lux value for virtual images of a VR scene, e.g., VR home screen 405. Simplified graph 403 illustrates the transition to an e.g., higher lux value. In the example, when the user exits VR home screen 405 and returns to a pass-through screen displaying dim real-world environment 402B, the lux value may fluidly decrease (e.g., 410).

In various embodiments, similar transitions occur when the user switches across any combination of display screens of pass-through images and virtual images (e.g., any virtual objects including panel Apps, UI windows, etc. within an MR mode). For example, from VR home screen 405, a user may open an App 407. App 407 may include graphics or virtual images that are much brighter or much dimmer than VR home screen 405. In FIG. 4, as an example, a brightness level may smoothly decrease (see, e.g., 408) as the user transitions to use App 407. Similarly, when the user leaves App 407, the brightness level may gradually or smoothly increase (see, e.g., 409).

In other embodiments, the color or brightness of the pass-through images and the virtual images are also adjusted to smoothly transition to or from the color or brightness of the real-world as a user puts on or takes off the HMD.

Figure 5:
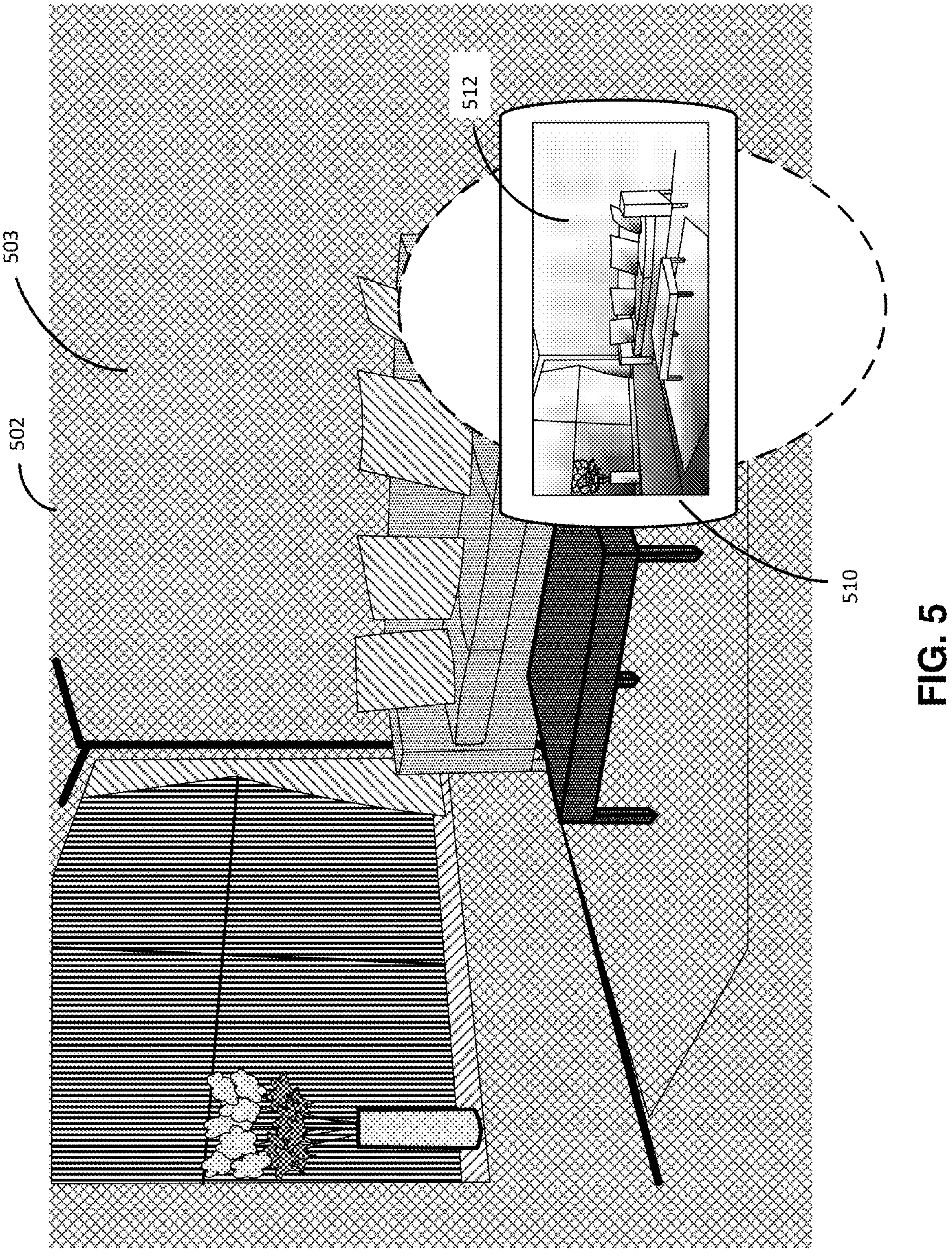
FIG. 5 illustrates a world-side scene with blue-light emissions and an adjustment of a color temperature of pass-through images or virtual images to a warmer temperature, in accordance with aspects of the disclosure.

Referring now to FIG. 5, where an HMD detects blue light emissions of a real-world environment and adjusts a color temperature of pass-through and virtual images to a warmer temperature, in embodiments. For example, real-world environment 502 includes ambient or environmental lighting 503 including blue light. In embodiments, a "relax mode" or "blue-light mode" of the HMD includes a world-side camera (155) or ALS (150) to automatically detect blue light emissions. A reduction of blue-light in a display image may help alleviate eye strain and promote better sleep patterns for a user. The "relax mode" may adapt to a range of lighting conditions and may intelligently adjust color warmth of a display image to maintain a balanced and comfortable visual experience. In aspects. display image 510 illustrates an automatic adjustment of the color temperature of ambient or environmental lighting 512 of pass-through images to a warmer color temperature.

In some examples, a color temperature or color warmth of display image 510 is brought to approximately 3600K. In other implementations, the color temperature of display image 510 is brought to around 3000K. In aspects, the relax mode may allow the user to tune the color temperature of display image 510. In addition to blue light reduction, an adaptive relax mode feature may be implemented, which allows users to set a desired screen warmth or coolness just once. In embodiments, an algorithm (e.g., discussed more in FIG. 6) can determine a correct input for, e.g., a night display function, to set color temperature for a display of virtual images (e.g., VR mode), by comparing dynamic camera AWB/CCT function with the user's desired CCT. In embodiments, such a setting may remain consistent even during transitions between MR modes and VR modes, despite changes in environmental lighting conditions.

In various embodiments, a virtual bias lighting in MR mode may provide subtle ambient illumination surrounding a display image (not shown). The virtual bias lighting may alleviate fatigue associated with extended viewing of a bright display image or screen against a dark background. For example, if the world-side scene is dark (e.g., a user's lights are off), a soft ambient lighting may be provided around a video frame to create a halo effect while users are engaged in prolonged video or movie viewing. In embodiments, virtual bias lighting may also improve perceived black levels and highlight overall contrast of the display image. In aspects, a brightness level and chromaticity of virtual bias lighting may be determined by the HMD based on information from the world-side camera regarding the real-world environment, enhancing the viewing experience.

Figure 6:
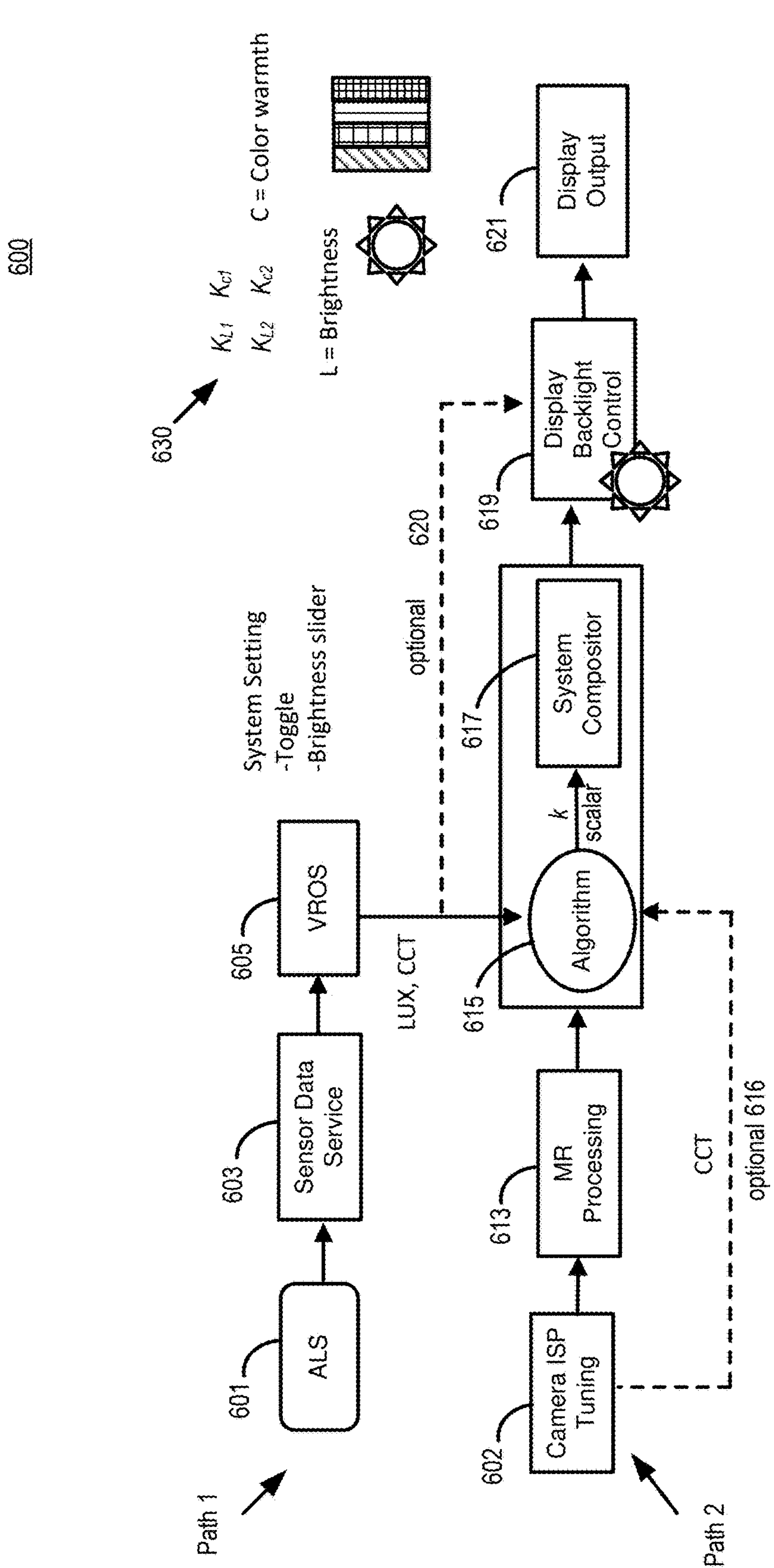
FIG. 6 is a diagram illustrating an example process, according to embodiments, in accordance with aspects of the disclosure.

Referring now to FIG. 6, which is a diagram illustrating an example process 600, according to embodiments. Process 600 may begin at a first path at block 601. For example, at block 601, an Ambient Light Sensor (ALS) may measure environmental light in terms of brightness and color temperature. In the alternative or in addition, process 600 may begin along a second path that starts at camera image signal process (ISP) tuning block 602, where a world-side camera ("camera") also measures brightness and detects a color temperature of the environmental light (in some instances, instead of the ALS).

Along the first path, at block 601, after the ALS measures ambient or environmental light, it provides color temperature and brightness information to a sensor data service 603 which in turn provides the data to a VR operating system (VROS) block 605. In some embodiments, VROS block 605 also receives values from a user's manual inputs (e.g., toggle or brightness slider) that may override previous system settings (e.g., auto-brightness feature etc.) or values from the ALS. In embodiments, the VROS may determine lux and CCT values to be provided to an environmental matching algorithm ("algorithm") block 615.

Algorithm block 615 also may receive data from MR Processing block 613 from the second path. The second path as noted above, begins at camera ISP tuning block 602 where the camera measures the environmental light. In aspects, camera ISP tuning generates adjusted pass-through images by applying AE and/or AWB functions to pass-through images captured by the camera. For example, the AWB function may analyze RGB values to determine a color temperature and adapt a white-point to adjust the color temperature to match ambient or environmental lighting or to reach other provided target CCT values. Note that in various aspects, the AWB may adjust the color temperature according to a perceptual matching table to resonate with ambient lighting color.

In aspects, the AE is set based on the environmental light measurements to adjust brightness of the pass-through images, thereby reducing further processing of the captured images. Thus, pass-through images may be adjusted by AE/AWB ISP functions and then provided from camera ISP tuning block 602 to an MR Processing block 613. In embodiments, MR processing block 613 may further adjust brightness and color warmth of pass-through images as well as determine virtual images that may need adjustment, if needed. In embodiments, MR processing block 613 may then provide virtual images as well as the pass-through images to block 615.

Thus, in aspects, the first and second path converge at algorithm block 615 which receives pass-through images and virtual images from VROS block 605 and/or MR Processing block 613.

In embodiments, at algorithm block 615, respective RGB k-scalar values ("k-scalar values") may be determined for a first layer (e.g., pass-through images), a second layer (e.g., graphics or virtual images), and/or a third layer (e.g., VR scene or home screen) of a display image.

Algorithm block 615 may provide the k-scalar values to system compositor block 617. In aspects, the system compositor is configured to digitally adjust brightness and white point for one or more of the various layers. In some aspects, if various layers are already adjusted by the camera ISP tuning process, adjustment via a k-scalar value may not be needed. For example, in some aspects, if pass-through images are already adjusted, k-scalar values are not needed for the first layer. In aspects, the k-scalar values may be used to adjust brightness and white point for the second layer (graphics or virtual images) and in some cases the third layer (e.g., VR home screen). For brightness control, in examples, k may be a fractional floating-point number ranging from 0 to 1. For white-point control, k may be represented as a 1×3 vector of floating points. In aspects, the system compositor digitally assembles a final image for display. The scalar k for brightness can be implemented by driving pixel brightness values or by directly driving a brightness of a backlight at display backlight control block 619, which may reduce power consumption for the HMD. Finally, harmonized or adjusted pass-through and virtual images are displayed at display output 621.

Note also that along the first path, optionally, at dotted line 620, VROS block 605 can provide lux target values directly to display backlight control 619 (skipping algorithm block 615 and system compositor block 617). Furthermore, along the second path, optionally at 616, during camera ISP tuning, CCT values can be provided directly to algorithm block 615.

Figure 7:
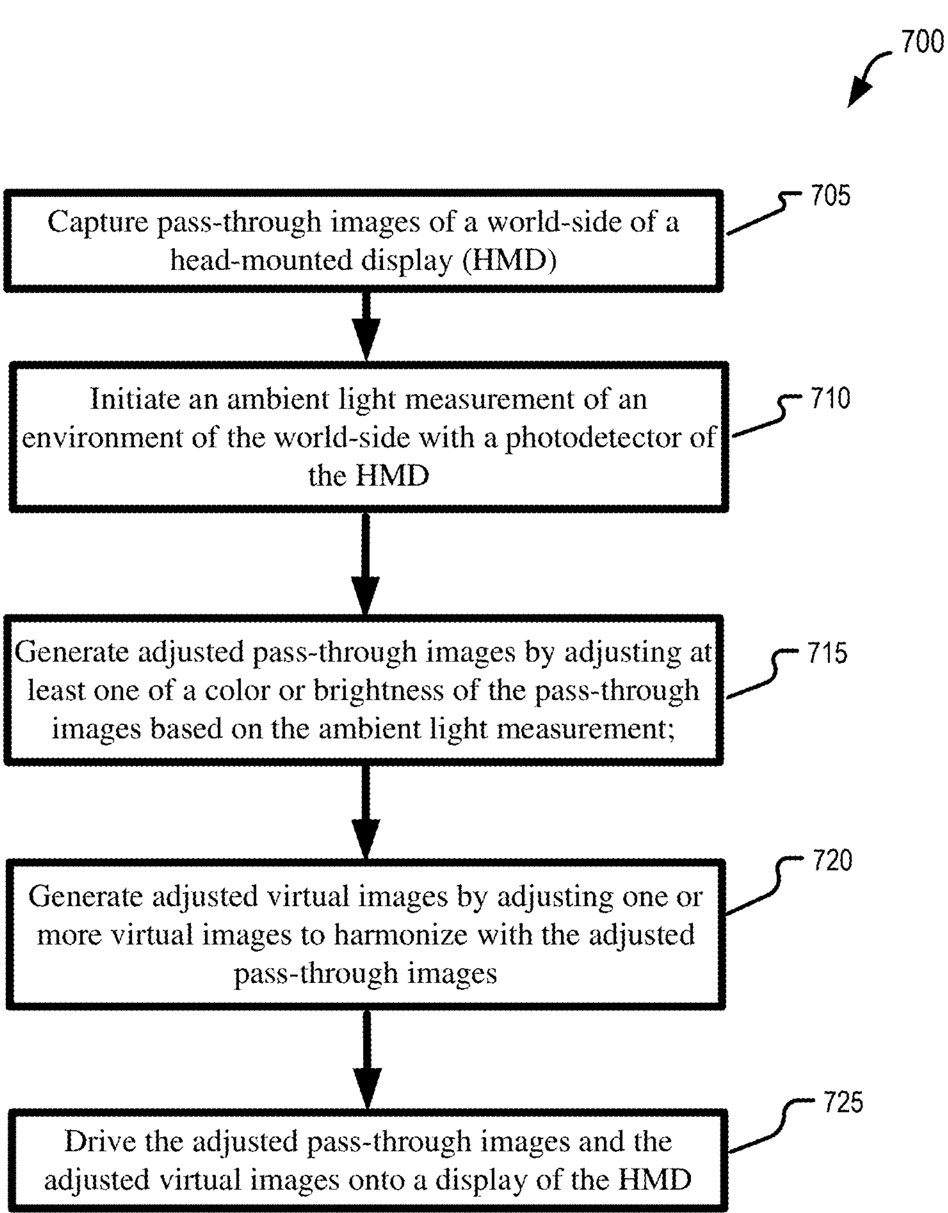
FIG. 7 is a flow diagram illustrating an example process according to embodiments, in accordance with aspects of the disclosure.

Referring now to FIG. 7, which is a flow diagram of a process 700 according to embodiments of the disclosure. In implementations, at process block 705, process 700 includes to capture, by e.g., a world-side camera, pass-through images of a world-side of a head-mounted display (HMD).

At process block 710, process 700 includes to initiate an ambient light measurement of an environment of the world side with a photo detector of the HMD. In some aspects, the photodetector is included in the world-side camera or an ambient light sensor (ALS) outside of the world-side camera.

At process block 715, process 700 includes to generate adjusted pass-through images by adjusting at least one of a color or brightness of the pass-through images based on the ambient light measurement, in aspects.

In an implementation, to generate the adjusted pass-through images includes to apply an automatic exposure (AE) or auto white balance (AWB) function to world-side images captured by the world-side camera.

In further implementations, process 700 is configured to adjust or further adjust the pass-through images or color based on manual inputs from a user of the head-mounted display.

At process block 715, in embodiments, process 700 includes to generate adjusted virtual images by adjusting one or more virtual images to harmonize with the adjusted pass-through images.

In examples, to generate the adjusted virtual images includes adjusting the virtual images based on previous user data In an implementation, to generate the adjusted virtual images includes to apply a k-scalar value in an environment matching algorithm to adjust a color temperature or brightness.

Additionally, process 700 may include to detect blue light emissions in the world-side scene by a photodetector of a world-side camera or ALS and to adjust a color temperature of the pass-through images or virtual images to a warmer temperature than the world-side scene.

In some implementations, process 700 may adjust a lux or a correlated color temperature (CCT) value of the pass-through images or the virtual images using an RGB scalar value for brightness and an RGB scalar value for color.

Process 700 may further include an auto-brightness feature based at least in part on previous user preferences to adjust the brightness and the color of the pass-through images and the virtual images, including on a pass-through homescreen.

Process 700 may also include to adjust the pass-through images or virtual images by causing a brightness of a display backlight to change. In an implementation, an adjustment of a lighting level of a backlight display of the head-mounted display reduces power consumption of the HMD.

In an implementation, process 700 is configured to cause ambient lighting to surround a virtual image or a pass-through image to reduce a contrast between the environment of the world-side scene and the pass-through images or the virtual images.

In addition, process 700 may include gradual adjustment of the color or brightness of the pass-through images and virtual images to smoothly transition to and/or from a view of a pass-through environment to a Virtual Reality (VR) scene. In some examples, the smooth transition is to and/or from a user's view of an environment of the world-side to a Virtual Reality (VR) scene, including a VR home screen.

In further implementations, the color or brightness of the pass-through images and the virtual images are adjusted to smoothly transition to or from a view of an outside world as a user puts on or takes off the head-mounted display.

At process block 725, in embodiments, process 700 includes to drive the adjusted pass through images and the adjusted virtual images onto a display of the HMD.

The order in which some or all of the blocks/process blocks appear in FIG. 6 and/or FIG. 7 should not be deemed limiting. Rather, one of ordinary skill in the art having the benefit of the present disclosure will understand that some of the process blocks may be executed in a variety of orders not illustrated, or even in parallel.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure. One or more elements of process 600 or 700 of respective FIG. 6 or FIG. 7 may be caused or initiated by one or more processing logic of the HMD.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head-mounted display comprising:

a world-side camera configured to capture pass-through images;

a photodetector configured to capture an ambient light measurement of an environment of a world-side scene;

a display configured to emit display light to an eyebox region; and one or more processing logic configured to:

receive the pass-through images from the world-side camera;

receive the ambient light measurement from the photodetector;

adjust the pass-through images subsequent to receiving the pass-through image from the world-side camera, wherein adjusting the pass-through images includes adjusting at least one of a color or brightness of the pass-through images based on the ambient light measurement;

adjust virtual images by adjusting one or more virtual images to harmonize with the adjusted pass-through images; and drive the adjusted pass-through images and adjusted virtual images on to the display.

2. The head-mounted display of claim 1 wherein the one or more processing logic is configured to adjust or further adjust the pass-through images or color based on manual inputs from a user of the head-mounted display.

3. The head-mounted display of claim 1 wherein the color or brightness of the pass-through images and the virtual images are adjusted to smoothly transition to or from a view of an outside world as a user puts on or takes off the head-mounted display.

4. The head-mounted display of claim 1 wherein the one or more processing logic is configured to implement an auto-brightness feature based at least in part on previous user preferences to adjust the brightness and the color of the pass-through images and the virtual images, including on a pass-through homescreen.

5. The head-mounted display of claim 1 wherein the photodetector detects blue light emissions in the world-side scene and the one or more processing logic is configured to adjust a color temperature of the pass-through images or virtual images to a warmer temperature than the world-side scene.

6. The head-mounted display of claim 1 further wherein the one or more processing logic is configured to cause ambient lighting to surround a virtual image or a pass-through image to reduce a contrast between the environment of the world-side scene and the pass-through images or the virtual images.

7. The head-mounted display of claim 1 wherein the photodetector is included in the world-side camera or an ambient light sensor (ALS) outside of the world-side camera.

8. The head-mounted display of claim 1 wherein the one or more processing logic is configured to adjust a lux or a correlated color temperature (CCT) value of the pass-through images or the virtual images using an RGB scalar value for brightness and an RGB scalar value for color.

9. The head-mounted display of claim 1 wherein the one or more processing logic is configured to adjust the pass-through images or virtual images by causing a brightness of a display backlight to change.

10. The head-mounted display of claim 1 wherein the color or brightness of the pass-through images and virtual images are gradually adjusted to smoothly transition to or from a view of a pass-through environment to a Virtual Reality (VR) scene.

11. The head-mounted display of claim 1, wherein the pass-through images are digitally adjusted.

12. The head-mounted display of claim 1, wherein an image signal processor (ISP) in the processing logic adjusts the pass-through images.

13. A method comprising:

capturing, pass-through images of a world-side of a head-mounted display (HMD);

initiating an ambient light measurement of an environment of the world-side with a photodetector of the HMD;

generating adjusted pass-through images by adjusting at least one of a color or brightness of the pass-through images based on the ambient light measurement, wherein generating the adjusted pass-through images is performed subsequent to capturing the pass-through images;

generating adjusted virtual images by adjusting one or more virtual images to harmonize with the adjusted pass-through images; and driving the adjusted pass-through images and the adjusted virtual images onto a display of the HMD.

14. The method of claim 13 wherein generating the adjusted pass-through images includes applying an automatic exposure (AE) or auto white balance (AWB) function to world-side images captured by a world-side camera.

15. The method of claim 13 wherein generating the adjusted virtual images includes applying a k-scalar value in an environment matching algorithm to adjust a color temperature or brightness.

16. The method of claim 13 wherein generating the adjusted pass-through images or virtual images includes causing adjustment of a lighting level of a backlight display of the head-mounted display to reduce power consumption.

17. The method of claim 13 further comprising receiving instructions from a manual user setting and adjusting the color or brightness of the pass-through images or the virtual images automatically on the user setting.

18. The method of claim 13 wherein the color or brightness of the pass-through images and virtual images are adjusted to smoothly transition to or from a view of an environment of the world-side to a Virtual Reality (VR) scene, including a VR home screen.

19. The method of claim 13 further comprising:

digitally assembling a final image including the adjusted pass-through images and the adjusted virtual image, wherein driving the adjusted pass-through images and the adjusted virtual images onto a display of the HMD includes rendering the final image to the display of the HMD.

20. A non-transitory computer readable medium including instructions stored thereon which when executed by one or more processors, cause a head-mounted display to:

capture pass-through images of a world-side of a head-mounted display (HMD);

initiate an ambient light measurement of an environment of the world-side with a photodetector of the HMD;

generate adjusted pass-through images by adjusting at least one of a color warmth or brightness of the pass-through images based on the ambient light measurement, wherein generating the adjusted pass-through images is performed subsequent to capturing the pass-through images;

generate adjusted virtual images by adjusting one or more virtual images to harmonize with the adjusted pass-through images; and drive the adjusted pass-through images and the adjusted virtual images onto a display of the HMD.

* * * * *